(No Model.) 4 Sheets—Sheet 1.

T. D. & A. S. McCALL.
BICYCLE.

No. 587,992. Patented Aug. 10, 1897.

Witnesses.
C. F. Kilgore
R. D. Merchant.

Inventors
Thomas D. McCall
Arthur S. McCall
By their Attorney.
Jas. F. Williamson (No Model.) 4 Sheets—Sheet 3.

T. D. & A. S. McCALL.
BICYCLE.

No. 587,992. Patented Aug. 10, 1897.

Witnesses
C. F. Kleym
R. D. Merchant

Inventors
Thomas D. McCall
Arthur S. McCall
By their Attorney
Jas. F. Williamson

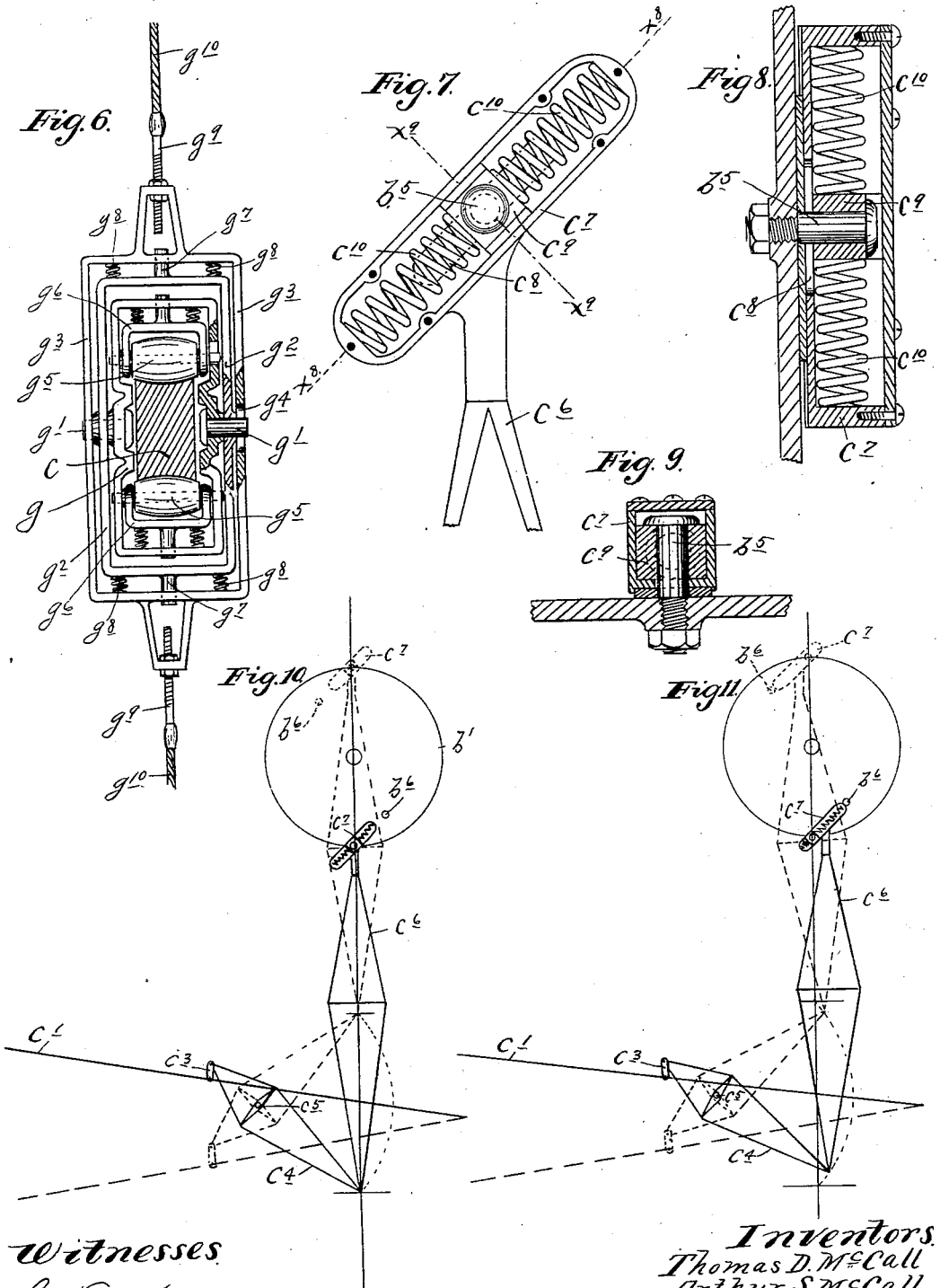

UNITED STATES PATENT OFFICE.

THOMAS D. McCALL AND ARTHUR S. McCALL, OF MINNEAPOLIS, MINNESOTA.

BICYCLE.

SPECIFICATION forming part of Letters Patent No. 587,992, dated August 10, 1897.

Application filed June 17, 1896. Serial No. 595,932. (No model.)

*To all whom it may concern:*

Be it known that we, THOMAS D. MCCALL and ARTHUR S. MCCALL, citizens of the United States, residing at Minneapolis, in the county of Hennepin and State of Minnesota, have invented certain new and useful Improvements in Bicycles; and we do hereby declare the following to be a full, clear, and exact description of the invention, such as will enable others skilled in the art to which it appertains to make and use the same.

Our invention relates to bicycles, and has for its object to provide a new driving mechanism for the same with a view of rendering large leverage available to the rider. In virtue of this large leverage the machine may be run at ordinary or moderate speed with very little power, and may be run at extremely-high speed by power easily within the capacity of the rider.

To these ends our invention consists of the novel devices and combination of devices hereinafter described, and defined in the claims.

The invention is illustrated in the accompanying drawings, wherein, like notations referring to like parts throughout the several views—

Figure 1:
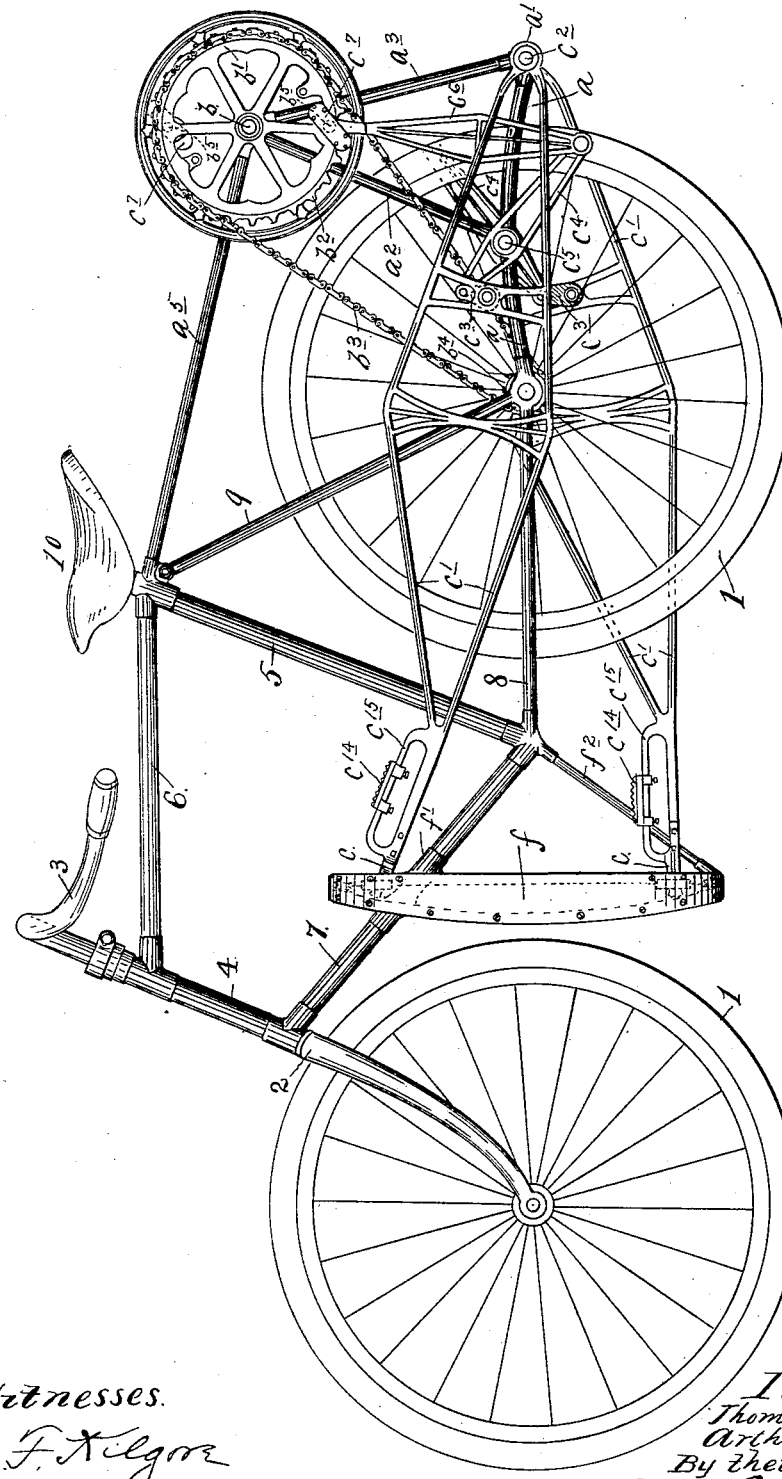
Figure 2:
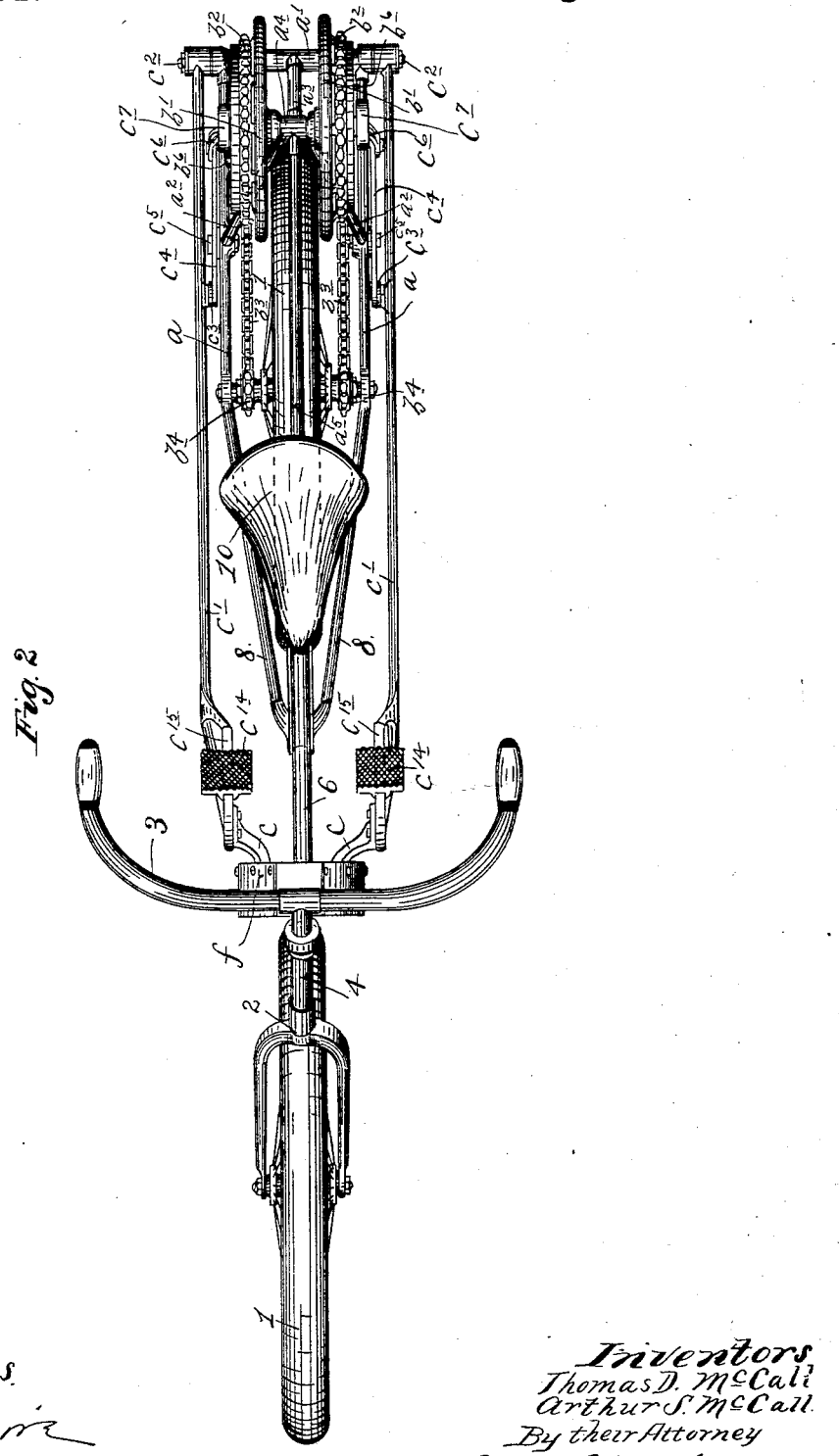
Figure 3:
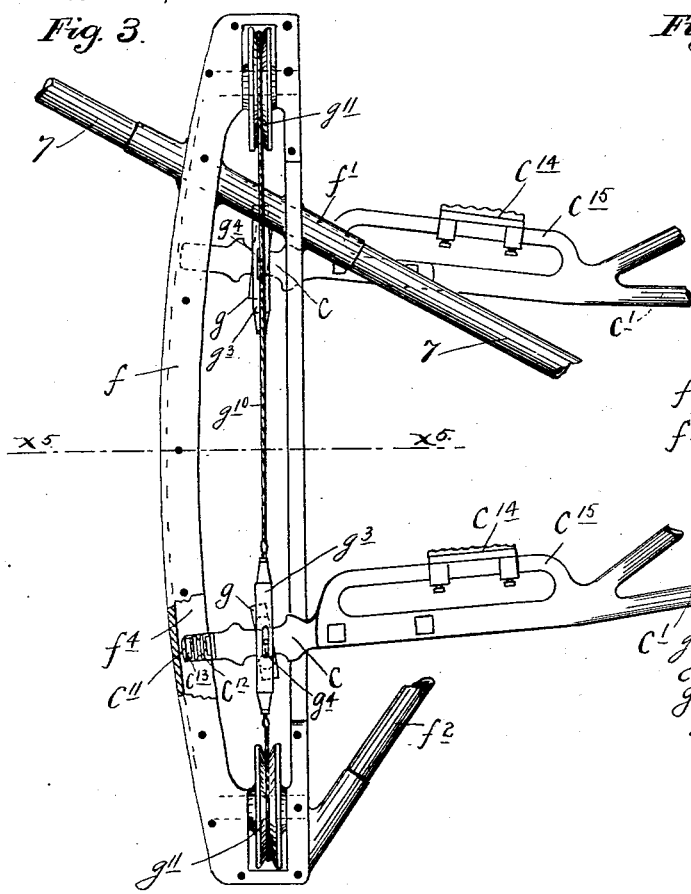
Figure 4:
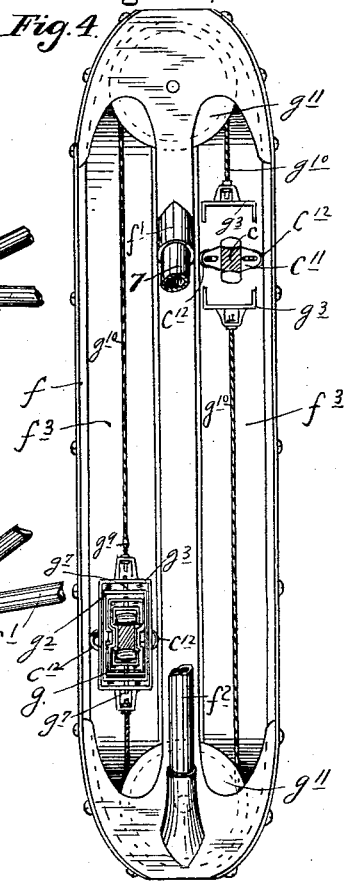
Figure 5:
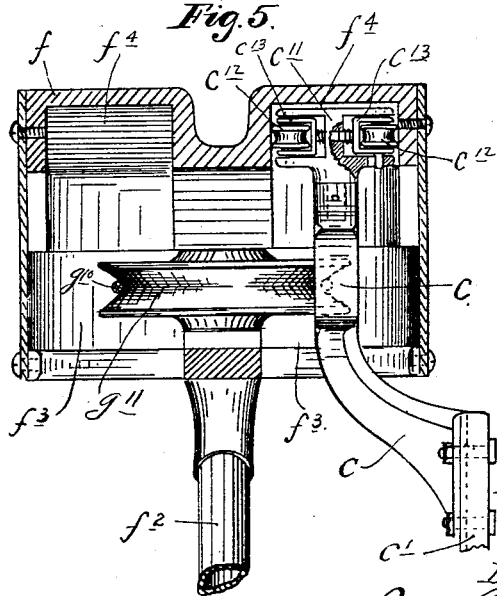

Figure 1 is a side elevation of a machine constructed according to our invention. Fig. 2 is a plan view of the same. Fig. 3 is a detail chiefly in side elevation, but partly in section with some portions broken away, showing the guides for the forward ends of the treadle-levers and the connections between the two levers. Fig. 4 is a view looking at the parts shown in Fig. 3 from the right with respect to Fig. 3 or from the rear with respect to the machine, with some parts shown in vertical section and some parts broken away. Fig. 5 is a section on the line $x^5 x^5$ of Fig. 3, with one of the treadle-levers just below the line of the section. Fig. 6 is a detail, partly in rear elevation and partly in vertical section, showing one of the treadle-lever yokes detached, but with the lever sectioned in working position. Fig. 7 is a detail in side elevation, showing the upper end pitman-head and crank-pin attachment with some parts removed. Fig. 8 is a section on the line $x^8 x^8$ of Fig. 7. Fig. 9 is a section on the line $x^9 x^9$ of Fig. 7. Figs. 10 and 11 are diagram views for illustrating the action of the peculiar devices connecting the pitmen with the crank-disks for rendering the machine easy to start when the crank-pins are on the dead-centers.

The old parts of the machine will be marked with numerals and the parts constituting our improvement will be distinguished by reference-letters.

The numerals 1, 2, and 3 represent, respectively, the wheels, the front fork, and the handle-bar. The numerals 4, 5, 6, 7, 8, and 9 represent the rigidly-connected tubing making up the main frame of substantially the ordinary diamond form. The numeral 10 represents the rider's seat. All of the said numbered parts so far noted are similar to the corresponding parts of the ordinary safety-bicycle. The diamond frame, however, as used by us is without the ordinary crank-hanger and crank-shaft at its lower angle.

Our improvement will now be described.

$a$ represents a pair of radius-bars fixed to the rear angle of the diamond frame and extending rearward on opposite sides of the rear wheel to a union with a spacing cross-tie or hub $a'$. The parts $a$ and $a'$ connect by convergent brace-rods $a^2$ and $a^3$ with a bearing-hub $a^4$. The hub $a^4$ is also connected by top rod $a^5$ with the upper angle of the diamond frame. The two brace-rods $a^2$ embrace the wheel and converge toward each other as well as toward the back rod $a^3$. In virtue of the said parts $a^2$, $a^3$, and $a^5$ the bearing-hub $a^4$ is rigidly supported at a point above and slightly to the rear of the rear wheel of the machine. In the bearing-hub $a^4$ is mounted a shaft $b$ on ball-bearings. (Not shown.) The relation of the bearing-hub $a^4$ and the shaft $b$ is similar to that of the ordinary crank-shaft and crank-shaft hanger.

To the ends of the shaft $b$ are fixed wheels $b'$. The said wheels $b'$ are provided with sprockets $b^2$ on their flanged rims, and the laterally-extended rims of the same serve as crank-disks, as will hereinafter more fully appear. The sprockets $b^2$ are connected by chains $b^3$ with small sprockets $b^4$ on the hub of the rear wheel. The crank-disk rims of the wheels $b'$ are provided with pins $b^5$ for connection to driving pitmen, as will hereinafter more fully appear.

$c\ c'$ are rigidly-connected parts, which together constitute the treadle-levers. The body portions $c'$ of these treadle-levers are connected to the frame-hub $a'$ by a pin or shaft $c^2$, and these parts are so constructed as to permit the said levers $c\ c'$ to turn on ball-bearings. (Not shown.) The body portions $c'$ of said treadle-levers connect by links $c^3$ to the short arms of transfer-levers $c^4$, mounted on stud-pins $c^5$, projecting outward from the radius-bars $a$. The long arms of the levers $c^4$ are connected to pitmen $c^6$. The said pitmen $c^6$ are provided with box-like heads $c^7$, set at an angle to the axes of the said pitmen. The said box-like heads $c^7$ are provided with slots $c^8$ for the entrance of the crank-pins $b^5$. The crank-pins $b^5$ connect to cross-heads $c^9$, mounted in said boxes $c^7$ and are normally held central by springs $c^{10}$, located within the said boxes $c^7$ and reacting between the cross-heads and the outer ends of the boxes. The purpose of this special form of connections between the pitmen $c^6$ and the crank-disk rims of the wheels $b'$ will be noted later on. The links $c^3$, the levers $c^4$, and the pitmen $c^6$ would in practice all be mounted to turn on ball-bearings.

The forward sections or arms $c$ of the treadle-levers are offset in respect to the body portions $c'$ of said treadle-levers, as best shown in Figs. 2 and 5.

A guide-box $f$ is rigidly supported from the main or diamond frame in proper position for coöperation with the forward ends of the treadle-lever arms $c$. As shown, the said guide-box $f$ is provided with a bearing-sleeve $f'$, brazed fast to the bottom rod 7 of the diamond frame, and the lower end of the said box $f$ is connected with the lower angle of the diamond frame by a stay-rod $f^2$. The front or main plate of the guide-box $f$ is formed on the arc of a circle having a radius equal to the length of the treadle-levers, or, otherwise stated, having as its common center with the treadle-levers the fulcrum-pin $c^2$ of said levers. The said guide-box $f$ is provided with openings or slots $f^3$ in the plate of the same facing the treadle-levers, and is also provided with guide-channels $f^4$, formed by its front or main plate. The forward arms $c$ of the treadle-levers extend into the guide-box $f$ through the slots $f^3$ and are provided with removable head-blocks $c^{11}$, which move in the guide-channels $f^4$. The said head-blocks $c^{11}$ are provided with rollers $c^{12}$, carried by yokes $c^{13}$, which are spring-seated in the head-blocks $c^{11}$ with freedom for a limited in-and-out movement in respect to said blocks, as clearly shown in Fig. 5. The treadle-levers are provided with foot-pieces $c^{14}$, shown as adjustably mounted on guide-bars $c^{15}$, formed integral with the forward ends of the body portion $c'$ of the treadle-levers.

The forward arms $c$ of the treadle-levers work through swivel-boxes $g$. The said swivel-boxes $g$ are provided with trunnions $g'$, having their bearings in the inner member $g^2$ of a pair of connected yokes $g^2\ g^3$ and movable in slots $g^4$ of the outer member thereof. The said swivel-boxes $g$ are provided with rollers $g^5$ in spring-seated yokes $g^6$, which rollers embrace the arms $c$ of the treadle-levers, as best shown in Fig. 6. The inside member of the pair of yokes $g^2\ g^3$ is provided with guide-stems $g^7$, which work outward through passages in the end bars of the outside yoke $g^3$, and springs $g^8$ are placed between the two yokes $g^2$ and $g^3$. Hence the swivel-boxes $g$ are themselves spring-seated and carry spring-seated rollers which embrace the treadle-levers. A double spring-cushion is therefore afforded for the forward arms of the treadle-levers. The outside yokes $g^3$ connect by suitable swivel-bolts $g^9$ or other equivalent devices with a cable $g^{10}$, which passes over guide-sheaves $g^{11}$, located at the opposite ends of the guide-box $f$. The two treadle-levers are therefore connected by the cable $g^{10}$ and the parts carried thereby, so as to insure equal movement in opposite directions under the treadle action. In virtue of the swivel-boxes $g$ there can be no cramping at the points of connection to the cable $g^{10}$. Otherwise stated, the swivel-boxes $g$ will always stand at right angles to the axes of the treadle-lever arms $c$, and will thereby prevent any cramping between the said arms of the said levers and the rollers $g^5$ of the swivel-boxes.

With the construction so far described it is obvious that the rider can impart an up-and-down motion to the treadle-levers in reverse order under an equally-timed action or uniform distribution of the power in virtue of the cable connections $g^{10}$. It is also obvious that the motion from the treadle-levers will, through the connections $c^3$, $c^4$, and $c^6$, impart rotary motion to the wheels $b$ and through the connections therefrom to the bicycle.

Inasmuch as the treadle-levers are very long and as the intermediate sprocket-wheels $b'$ are located near the fulcrum of the same, the point of attachment of the intermediate driving-levers must be at a point on said treadle-levers, where, although they have great power, they have very little movement. In order to give an increased movement of the pitmen, the transfer-levers $c^4$ are provided.

The ball-bearings for the bicycle-wheels and for the various parts of the driving connections have not been shown, but they would of course be of the ordinary or any suitable construction. The fact of the two sprockets $b^2$ and connections therefrom to the bicycle-wheel insures an equal distribution of the strain on opposite sides of the wheel, thereby rendering the machine easier to balance. The size and weight of the wheels $b$ render the same suitable for serving the function of balance-wheels. Hence under high speed the set of wheels $b'$ will tend to preserve uniformity of speed, even if the treadle-power be more or less irregular.

Returning now to the connections between the pitmen $c^6$ and the crank-disk arms of the wheels $b$, it should be further noted that the said wheels are provided with stop-pins $b^6$ for coöperation with the ends of the pitman-heads $c^7$. The purpose of said pins $b^6$ and special connections or parts $c^7$ to $c^{10}$, inclusive, is to permit the machine to be readily started when the crank-pins are on the dead-centers. That these connections will render leverage available off the center for starting the wheels $b$ may be seen by inspection of the diagram views Figs. 10 and 11. In Fig. 10 the crank-pins are represented as on the dead-centers and all the levers as in the proper corresponding positions. If now power be applied to the upper member of the treadle-levers, as shown in Fig. 10, all the parts will be thrown into the position shown in Fig. 11, or, otherwise stated, the upper end of the lower pitman will be thrown forward against one of the stop-pins $b^6$ and the lower end of the upper pitman-head will be pulled down against the corresponding stop-pin $b^6$. These strokes from the two pitman-heads $c^7$ on the pins $b^6$ of the crank-disks of the wheels $b$ will throw the said wheels forward sufficient to bring the crank-pins off the dead-centers. In this movement of the pitman-heads $c^7$ the cross-heads $c^9$ are held by the crank-pins $b^5$ and one of the springs $c^{10}$ in each pitman-head is compressed, while the slots $c^8$ permit the pitman-heads to make this movement in respect to the crank-pins and cross-heads. In virtue of these connections between the pitman-heads and the crank-disks of the wheels $b$ it is thought, by the applicants, that the machine may be started from any and all positions by power applied to the treadle-levers.

The general advantages of our machine have already been stated.

It will be understood, of course, that many modifications might be made in the details of construction without departing from the spirit of our invention. It will of course be understood that the parts of the rigid frame would preferably be made of tubing in the ordinary way and that all the driving-levers and connections might be made in any suitable form and of any suitable material.

What we claim, and desire to secure by Letters Patent of the United States, is as follows:

1. In a bicycle, the combination with treadle-levers and connections therefrom, for driving the machine, of guides for the forward ends of said treadle-levers, and a flexible connection running over guide-sheaves and connecting both the upper and under portions of said levers, thereby positively causing reverse movements of said levers in common time, substantially as described.

2. In a bicycle, the combination with treadle-levers and connections therefrom, for driving the machine, of a flexible connection running over guide-sheaves and provided with swivel-boxes embracing the forward arms of the treadle-levers, substantially as described.

3. The combination with the forward arms of the treadle-levers, of the cable $g^{10}$ having the yokes $g^2$, $g^3$, the swivel-boxes $g$ in said yokes, and the yieldingly-mounted rollers $g^5$ in said swivel-boxes and embracing the forward arms of the treadle-levers, substantially as described.

4. In a bicycle, the combination with the treadle-levers and connections therefrom, for driving the machine, of guides for the forward ends of said treadle-levers, and head-blocks on said levers provided with spring-seated rollers working in said guides, substantially as described.

5. The combination with a pitman, crank, crank-disk and crank-pin, of an angular head on said pitman, a cross-head working in said head as a guide, and connected to the crank-pin, springs in said head tending to center said cross-head, and a pin on the crank-disk, in the path of said pitman-head, when moved in respect to the cross-head, for starting the disk when the pin is on the dead-center, substantially as described.

In testimony whereof we affix our signatures in presence of two witnesses.

THOMAS D. McCALL.
ARTHUR S. McCALL.

Witnesses:
JAS. F. WILLIAMSON,
F. D. MERCHANT.